(12) United States Patent
Tang et al.

(10) Patent No.: US 12,225,565 B2
(45) Date of Patent: Feb. 11, 2025

(54) METHODS AND APPARATUS OF SPATIAL RELATION SWITCHING IN NEW RADIO SYSTEM

(71) Applicant: MediaTek Singapore Pte. Ltd., Singapore (SG)

(72) Inventors: Zhixun Tang, Beijing (CN); Tsang-Wei Yu, Hsin-Chu (TW); Hsuan-Li Lin, Hsin-Chu (TW)

(73) Assignee: MEDIATEK Singapore Ptd. Ltd, Singapore (SG)

( * ) Notice: Subject to any disclaimer, the term of this patent is extended or adjusted under 35 U.S.C. 154(b) by 965 days.

(21) Appl. No.: 17/171,075

(22) Filed: Feb. 9, 2021

(65) Prior Publication Data

US 2021/0250949 A1     Aug. 12, 2021

Related U.S. Application Data

(63) Continuation of application No. PCT/CN2020/074812, filed on Feb. 12, 2020.

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0617* (2013.01); *H04L 5/0048* (2013.01);
(Continued)

(58) Field of Classification Search
CPC ........... H04W 72/0493; H04W 72/042; H04W 72/046; H04W 80/02; H04W 24/10; H04L 5/0048; H04L 25/0226; H04B 7/0617
See application file for complete search history.

(56) References Cited

U.S. PATENT DOCUMENTS

2019/0261320 A1\*  8/2019  Yu .................... H04W 56/001
2020/0274606 A1\*  8/2020  Kang ................. H04L 5/0051
(Continued)

FOREIGN PATENT DOCUMENTS

CN          110474668 B  \*  3/2021  .......... H04B 17/373
WO     WO 2019190377 A1      3/2019

OTHER PUBLICATIONS

Taiwan IP Office Written Opinion and search report for application 110105013, mailed on Dec. 29, 2022, 7 pages.
(Continued)

*Primary Examiner* — Parth Patel
(74) *Attorney, Agent, or Firm* — Helen Mao; Imperium Patent Works

(57) ABSTRACT

Methods and apparatus of performing spatial relation switching in new radio (NR) system is proposed. In one embodiment, a configured spatial relation of an uplink channel is Quasi-Co-Located (QCLed) to the source of a downlink reference signal (DL RS). In this QCLed relation, the active spatial relation switching shall differentiate known and unknown situation. In another embodiment, the configured spatial relation is QCLed to the root source of an uplink sounding reference signal (SRS). In this QCLed relation, the active spatial relation switching does not need to differentiate known and unknown situation. The proposed spatial relation switching shall apply for physical uplink shared channel (PUSCH), physical uplink control channel (PUCCH), and SRS transmission.

12 Claims, 5 Drawing Sheets

(51) Int. Cl.
*H04L 5/00* (2006.01)
*H04L 25/02* (2006.01)
*H04W 24/10* (2009.01)
*H04W 72/044* (2023.01)
*H04W 72/23* (2023.01)
*H04W 80/02* (2009.01)

(52) U.S. Cl.
CPC ......... *H04L 25/0226* (2013.01); *H04W 24/10* (2013.01); *H04W 72/046* (2013.01); *H04W 72/23* (2023.01); *H04W 80/02* (2013.01)

(56) References Cited

U.S. PATENT DOCUMENTS

| | | | | |
|---|---|---|---|---|
| 2021/0099223 | A1* | 4/2021 | Zhang | H04B 7/0877 |
| 2021/0105176 | A1* | 4/2021 | Tsai | H04L 41/0816 |
| 2021/0143956 | A1* | 5/2021 | Lin | H04W 72/23 |
| 2021/0185609 | A1* | 6/2021 | Zhou | H04W 52/0206 |
| 2021/0250949 | A1* | 8/2021 | Tang | H04B 7/0617 |
| 2021/0307076 | A1* | 9/2021 | Matsumura | H04B 7/0695 |
| 2022/0173784 | A1* | 6/2022 | Gao | H04B 7/0874 |
| 2022/0216929 | A1* | 7/2022 | Matsumura | H04W 52/242 |
| 2022/0225120 | A1* | 7/2022 | Matsumura | H04L 5/0051 |
| 2022/0321292 | A1* | 10/2022 | Matsumura | H04W 72/23 |
| 2022/0407656 | A1* | 12/2022 | Matsumura | H04L 5/006 |
| 2023/0027791 | A1* | 1/2023 | Yuan | H04W 8/22 |
| 2023/0047929 | A1* | 2/2023 | Matsumura | H04L 5/0053 |
| 2023/0291459 | A1* | 9/2023 | Zhang | H04B 7/0828 |

OTHER PUBLICATIONS

R4-1913316 MediaTek Inc. Discussion on CSI-RS configuration update for CQI reporting and active spatial relation switch 3GPP TSG-RAN WG4 Meeting Nov. 18-22, 2019, Section 3. (claims 1-3, 5-7, 9, 10,4. 8).
R4-1912766 Mediatek Inc. WF on TCI state and spatial relation switch 3GPP TSG-RN WG4 Oct. 14-18, 2019, p. 5 (Claims 4, 8).
Taiwan IP Office Written Opinion and search report for application 110105013, mailed on Nov. 5, 2021, 10 pages.
R1-1908192, ZTE: "Enhancements on Multi-beam Operation", 3GPP TSG-RAN WG4 meeting #98, Prague, CZ, Aug. 26-30, 2019.
EPO Written Opinion and search report for application 21156764. 9-1212, mailed on Jul. 21, 2021, 12 pages.
R4-1913316, MediaTek Inc: "Discussion on CSI-RS configuration update for CQI reporting and active spatial relation switch", 3GPP TSG-RAN WG4 meeting #93, Reno, Nevada, USA Nov. 18-22, 2019.
R4-1912766, MediaTek Inc: "WF on TCI state and spatial relations switch", 3GPP TSG-RAN WG4 #92bis Meeting, Chongqing, China, Oct. 14-18, 2019.
R4-1913314, MediaTek Inc: "Discussion on remaining issues on TCI state switch", 3GPP TSG-RAN WG4 Meeting #93, Reno, Nevada, USA Nov. 18-22, 2019.

* cited by examiner (a) FORMAT 0-0    (b) FORMAT 0-1

(a) PERIODIC SRS    (b) SEMI-PERSISTENT SRS    (c) APERIODIC SRS

# METHODS AND APPARATUS OF SPATIAL RELATION SWITCHING IN NEW RADIO SYSTEM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/2020/074812 entitled "Methods and Apparatus of Spatial Relation Switching for NR Communication" filed on Feb. 12, 2020. International Application No. PCT/2020/074812 is pending as of the filing date of this application, and the United States is a designated state in International Application No. PCT/2020/074812. This application claims priority under 35 U.S.C. § 119 from Chinese Application No. CN 202110143540.5, entitled "Methods and Apparatus of Spatial Relation Switching for NR Communication," with a filing date of Feb. 2, 2021, the subject matter of each of the foregoing reference is incorporated herein by reference.

TECHNICAL FIELD

The disclosed embodiments relate generally to wireless communication, and, more particularly, to methods and apparatus for Spatial Relation Switching in New Radio (NR) communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

The bandwidth shortage increasingly experienced by mobile carriers has motivated the exploration of the under-utilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. In principle, beam training mechanism, which includes both initial beam alignment and subsequent beam tracking, ensures that base station (BS) beam and user equipment (UE) beam are aligned for data communication. In downlink DL-based beam management (BM), the BS side provides opportunities for UE to measure beamformed channel of different combinations of BS beams and UE beams. Similarly, in uplink UL-based BM, the UE side provides opportunities for BS to measure beamformed channel of different combinations of UE beams and BS beams.

Two signals transmitted from the same antenna and the same beam experience the same radio channel. If two signals transmitted from different antennas or beams experience radio channels having common properties, then the two signals are said to be spatially quasi-co-located (QCLed). In 5G NR, each BS beam broadcasts minimum amount of cell-specific and beam-specific information via synchronization signal (SS) blocks (SSB). Additionally, spatial relation among SSB and other reference signals (RSs) is signaled by the network to UE to indicate the QCL-type for uplink channels. The network can indicate to UE the target spatial relation to UE to change the QCL-type by radio resource control (RRC) configuration, media access control (MAC)-control element (CE) activation, and downlink control information (DCI) indication.

Solution is sought to improve spatial relation switching, e.g., how to switch an active spatial relation to a new spatial relation efficiently.

SUMMARY

Methods and apparatus of performing spatial relation switching in new radio (NR) system are proposed. In one embodiment, a configured spatial relation of an uplink channel is Quasi-Co-Located (QCLed) to the source of a downlink reference signal (DL RS), such as a synchronization signal (SS) blocks (SSB) or a channel state information reference signal (CSI-RS), where the terminology 'QCLed' means associated to in the document below. In this QCLed relation, the active spatial relation switching shall differentiate known and unknown situation. In known condition, when UE receives the spatial relation configuration, the UE parses this configuration and optionally executes the fine timing tracking on the new configured QCLed RS. After that, the UE switches its spatial relation based on the new configuration. In unknown condition, in addition to the above procedure, the UE also executes the L1-RSRP measurement after UE parses the spatial relation configuration and before the possible fine timing tracking and spatial relation switching. In another embodiment, the configured spatial relation is QCLed to the root source of an uplink sounding reference signal (SRS). In this QCLed relation, the active spatial relation switching does not need to differentiate known and unknown situation. When UE receives the spatial relation configuration, the UE parses this configuration and switches the spatial relation followed with the configured SRS index.

The proposed spatial relation switching shall apply for physical uplink shared channel (PUSCH), physical uplink control channel (PUCCH), and SRS transmission. In PUCCH, the MAC based spatial relation switch shall be defined. In PUSCH, spatial relation activation shall only follow the related PUCCH or SRS spatial relation switch procedure. In periodic SRS, the RRC based spatial relation switch shall be defined. In semi-persistent SRS, the MAC based spatial relation switch shall be defined. In aperiodic SRS, the DCI based spatial relation switch shall be defined. The aperiodic SRS should always associate with a known spatial relation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections. The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure. Some variations of the embodiments are described. Throughout the various views and illustrative embodiments, like reference numbers are used to designate like elements.

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto. Reference will now be made in detail to some embodiments of the invention, examples of which are illustrated in the accompanying drawings.

Figure 1:
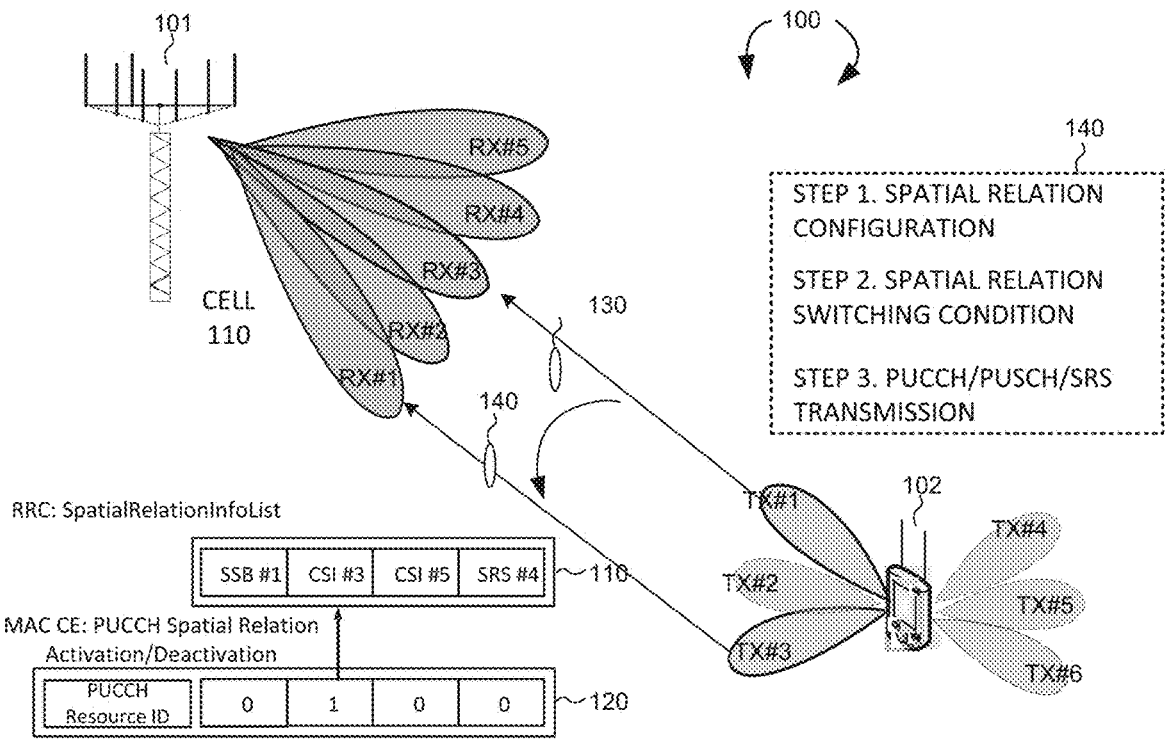
FIG. 1 illustrates a system diagram of a new radio (NR) beamforming wireless system with spatial relation switching in accordance with embodiments of the current invention.

FIG. 1 illustrates a system diagram of a new radio (NR) beamforming wireless system 100 with spatial relation switching in accordance with embodiments of the current invention. Beamforming milli-meter (mmWave) mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, for uplink transmission, cell 110 is covered by a set of five BS RX beams RX #1, RX #2, RX #3, RX #4, and RX #5. The collection of the BS RX beams RX #1-RX #5 covers an entire service area of cell 110. Similarly, UE 102 may also apply beamforming to form multiple UE TX beams, e.g., TX #1-TX #5. For beamformed access, both ends of a link need to know which beamformers to use, e.g., a serving beam pair link (BPL) 130 for uplink communication between BS 101 (using RX #3) and UE 102 (using TX #1). BS 101 may also be referred to as an access point (AP), an access terminal, a Node-B, an eNodeB, an eNB, a gNodeB, a gNB, or by other terminology used in the art. UE 102 may be a mobile phone, a laptop computer, a device carried in a vehicle, an Internet of Things (IoT) device, etc.

In 5G NR, each BS control beam broadcasts minimum amount of cell-specific and beam-specific information via synchronization signal (SS) blocks (SSB). Additionally, spatial relation is signaled by the network to UE to indicate the Quasi Co-Location (QCL)-type between uplink channel resource and reference signals. The uplink channels include physical uplink control channel (PUCCH) and physical uplink shared channel (PUSCH). Two kinds of spatial relation are defined. A first kind of {QCL-TypeA, QCL-TypeB, QCL-TypeC} is related to channel statistical character. A second kind of {QCL-TypeD} is related to spatial TX parameters which are the parameters related to FR2 only. The spatial relation information indicates the spatial filter (e.g., TX beam) to be used by UE for the corresponding PUCCH or PUSCH or sounding reference signal (SRS) transmission. The network can indicate the target spatial relation to UE to change the QCL-type by radio resource control (RRC) configuration, media access control (MAC)-control element (CE) activation, and downlink control information (DCI) indication.

As depicted in FIG. 1, a spatial relation information, e.g., a spatial relation between a spatial TX filter for a dedicated uplink resource and a spatial filter for a reference signal resource, can be indicated by RRC signaling or RRC+MAC CE. In one example (110), a SpatialRelationInfoList, which contains one or more PUCCH-SpatialRelationInfo Information Elements (IEs), is configured in a dedicated PUCCH resource configuration via RRC signaling. Each PUCCH-SpatialRelationInfo IE can include a synchronization signal block (SSB) resource indicator (SSBRI), a channel state information reference signal (CSI-RS) resource indicator (CRI), or a sounding reference signal (SRS) resource indicator (SRI), to indicate the spatial filter (e.g., the UE TX beam) to be used by UE associated to the corresponding PUCCH transmission. When the number of PUCCH-SpatialRelationInfo IEs in SpatialRelationInfoList is more than one, then a MAC CE is used to point to one of the PUCCH-SpatialRelationInfo IEs for indicating spatial relation information for a dedicated PUCCH resource. In the example of FIG. 1, the SpatialRelationInfoList 110 contains at most four PUCCH-SpatialRelationInfo IEs including SSB #1, CSI #3, CSI #5, and SRS #4. A MAC CE 120 including a four-bit bitmap and a PUCCH resource ID for PUCCH spatial relation activation, with a second bit of the bitmap having value 1, is then used to indicate that UE 102 can assume a spatial relation between a spatial filter for CSI #3 and a spatial filter for UE PUCCH transmission on a dedicated PUCCH resource indicated by the PUCCH resource ID.

FIG. 1 further shows an example of spatial relation switching when the spatial relation is configured to be QCLed with a downlink reference signal (DL RS) or an uplink sounding reference signal (UL SRS), where, the terminology 'QCLed' can also be referred to as associated. At first, the network configures the current spatial relation to request the UE to use TX #1 (the active spatial filter) to transmit the signals. The network used the RX #3 to receive the transmission signals (e.g., BPL 130). After a while, the network detects that UE using TX #3 is better than using TX #1. Then the network configures the new spatial relation to request the UE to switch its TX beam to TX #3 (the target spatial filter). The network can use its RX #1 to receive the signals from UE (e.g., BPL 140). The new target spatial relation is configured to be QCLed with a DL RS or UL SRS. The spatial relation information can be provided by the network via RRC signaling, MAC CE activation or DCI indication.

In one novel aspect, a method of performing spatial relation switching in NR system is proposed as depicted in 140. In one embodiment, the configured spatial relation is QCLed to the source of a DL RS, such as SSB or CSI-RS (step 1). In this QCLed relation, the active spatial relation switching condition shall differentiate known and unknown situation (step 2). In known condition, when UE receives the spatial relation configuration, the UE parses this configuration and executes the fine timing tracking on the new configured QCLed RS. After that, the UE switches its spatial relation to the new configuration. In unknown condition, in addition to the above procedure, the UE also executes the L1-RSRP measurement after UE parses the spatial relation configuration and before the fine timing tracking. In another embodiment, the configured spatial relation can be QCLed to the root source of an UL SRS (step 1). In this QCLed relation, the active spatial relation switching condition does not need to differentiate known and unknown situation (step 2). When UE receives the spatial relation configuration, the UE parses this configuration and switches the spatial relation following with the configured SRS index.

The proposed spatial relation switching shall apply for PUSCH, PUCCH, and SRS transmission (step 3). In PUCCH, the MAC based spatial relation switch shall be defined. In PUSCH, spatial relation activation shall only follow the related PUCCH or SRS spatial relation switch procedure. In periodic SRS, the RRC based spatial relation switch shall be defined. In semi-persistent SRS, the MAC based spatial relation switch shall be defined. In aperiodic SRS, the DCI based spatial relation switch shall be defined. The aperiodic SRS should always associate with a known spatial relation.

Figure 2:
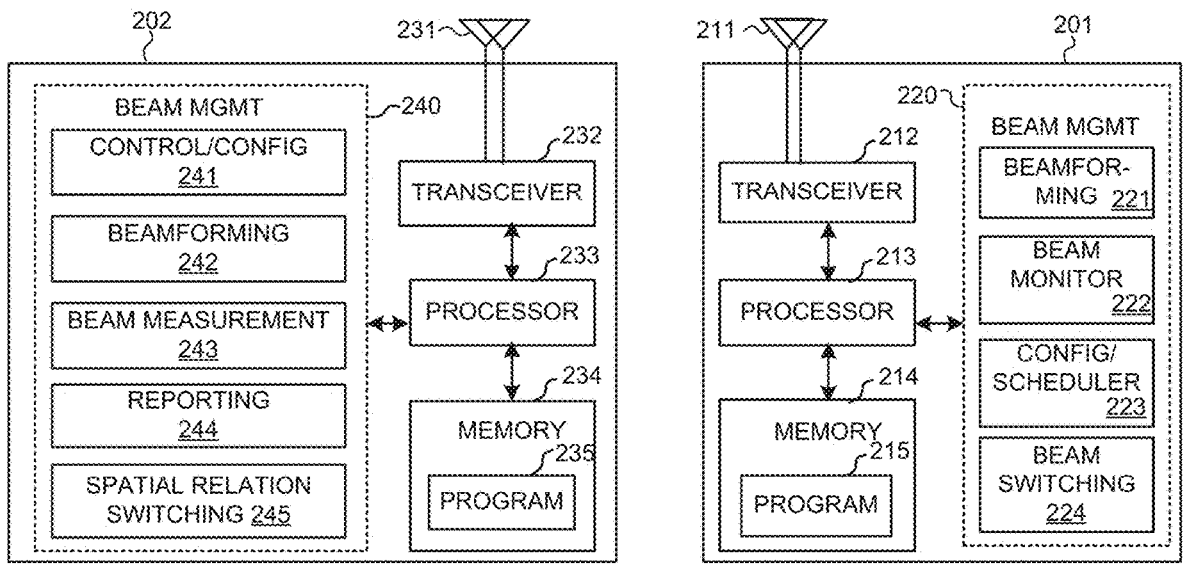
FIG. 2 shows simplified block diagrams of a UE and a BS in accordance with embodiments of the current invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuitry that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuitry that carry out different tasks in accordance with embodiments of the current invention.

The functional modules and circuits can be implemented and configured by hardware, firmware, software, and any combination thereof. For example, BS 201 comprises a beam management module 220, which further comprises a beamforming circuit 221, a beam monitor 222, a config and scheduling circuit 223, and an beam config and switching handling circuit 224. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Config and scheduling circuit 223 schedules uplink transmission for UEs and configures radio resources with spatial relation info and switching to UEs for uplink transmission. Beam config and switching handling circuit 224 handles spatial relation switching procedure.

Similarly, UE 202 comprises a beam management module 240, which further comprises a control and configuration circuit 241, a beamforming circuit 242, a beam measurement circuit 243, a measurement reporting circuit 244, and a spatial relation switching handling circuit 245. Control and configuration circuit 241 receives configuration information from the serving BS via RRC signaling and/or MAC CE and/or PDCCH DCI. The configuration information may comprise uplink resource and spatial relation information. Beamforming circuit 242 may belong to part of the RF chain, which applies various beamforming weights to multiple antenna elements of antenna 231 and thereby forming various beams based on the UL control beam indication from the network. Beam measurement circuit 243 perform L1 RSRP measurements over configured measurement objects. Beam measurement reporting circuit 244 reports measurement results. Spatial relation switching handling circuit 245 handles spatial relation switching procedure, and determines whether to perform beam sweeping and L1 measurements depending on whether the configured spatial relation is known or unknown.

Figure 3:
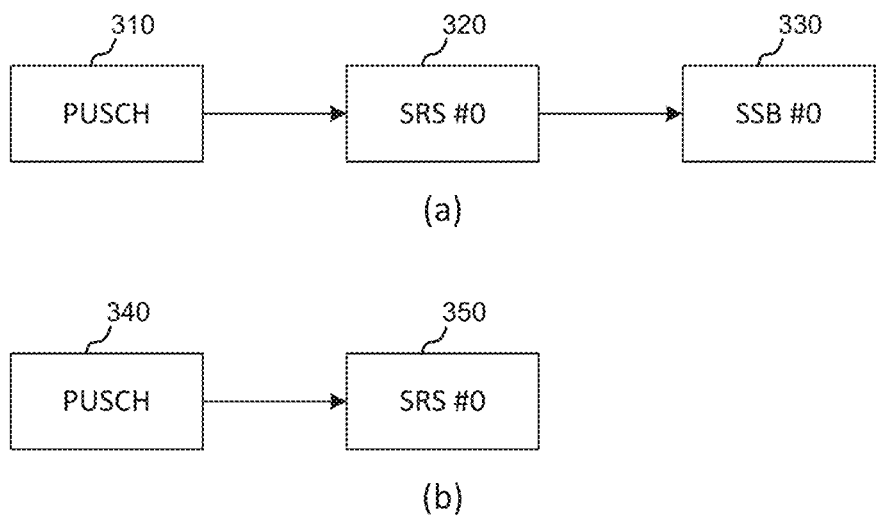
FIG. 3 illustrates examples of definition of spatial relation Quasi-Co-Located (QCLed) source reference signals (RSs).

FIG. 3 illustrates examples of definition of spatial relation Quasi-Co-Located (QCLed) source reference signals (RSs). In FIG. 3(a), a PUSCH channel 310 is configured a spatial relation to be QCLed with SRS index #0 320, and this SRS #0 320 is already configured to be QCLed with a DL SSB #0 330. As a result, the source of PUSCH channel 310's QCLed spatial relation is DL RS, e.g., SSB #0 330. The DL RS can be either SRS or CSI-RS. In FIG. 3(b), a PUSCH channel 340 is configured a spatial relation to be QCLed with SRS index #0 350, and this SRS #0 350 has no other QCLed relation being configured. Basically, this SRS can be configured with 'beamManagement'. As a result, the source of PUSCH channel 340's QCLed spatial relation is UL SRS, e.g., SRS #0 350.

Figure 4:
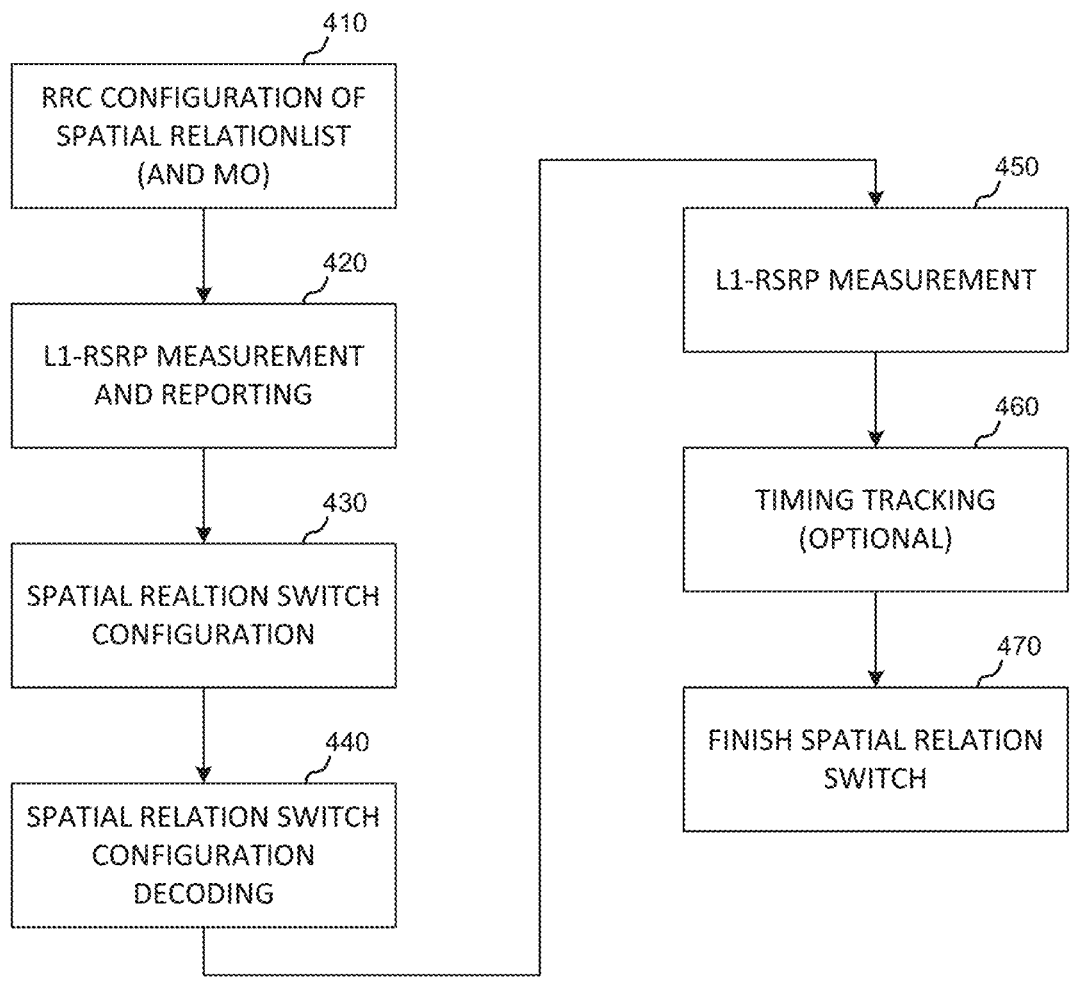
FIG. 4 illustrates one embodiment of a spatial relation switching procedure when the configured spatial relation is QCLed to a DL RS.

FIG. 4 illustrates one embodiment of a spatial relation switching procedure when the configured uplink target spatial relation is QCLed to a DL RS. When the QCLed source is a DL RS, such as SSB or CSI-RS, the known or unknown condition of the configured target spatial relation for spatial relation switching needs to be defined. The configured target spatial relation is known if the following conditions are met: 1) the spatial relation switch is within [X]s of last transmission of beam reporting or beam measurement for the QCLed RS of the target spatial relation, such as X=1.28s; 2) the UE has previously sent at least one measurement report for the QCLed RS of the target spatial relation; 3) the spatial relation shall remain detectable during the spatial relation switching period, e.g., the SNR of the QCLed RS and the root QCLed SSB/CSI-RS is always larger than a threshold, e.g., −3 dB, during the overall duration for spatial relation switching; and 4) the SNR of the RS which the target spatial relation is configured to be QCLed is greater than a threshold, e.g., >−3 dB. Otherwise, the configured target spatial relation is unknown.

In the example of FIG. 4, in step 410, a UE receives a SpatialRelationInfoList and optionally Measurement Object (MO) from a serving BS in NR network. In step 420, the UE performs L1-RSRP measurement and reporting based on the MO. If the configured spatial relation is known, when network receives the UE's measurement reporting, the network may configure the UE to switch to a new spatial relation. When UE receives the spatial relation switch command, the UE only needs to decode the command and optionally execute one-shot fine timing tracking. After that, the UE will finish the active spatial relation switch, e.g., using the new spatial relation for uplink channel transmission. Otherwise, if the configured spatial relation is unknown, the network may configure the UE to switch to a new spatial relation without any measurement information. When UE receives the spatial relation switch command, the UE needs to decode the command. After that, the UE executes RX beam sweeping and performs L1-RSRP measurements to find the best RX beam and then do the one-shot fine timing tracking. After that, the UE will finish the active spatial relation switch, e.g., using the new spatial relation for uplink channel transmission.

Accordingly, in step 430, the UE receives spatial relation configuration from the network to switch to a new spatial relation. In step 440, the UE decodes the spatial relation configuration. If the spatial relation is known, then the UE skips step 450 and optionally performs one-shot timing tracking in step 460. In step 470, the UE finishes the spatial relation switch procedure and switches to the new spatial relation. Otherwise, if the spatial relation is unknown, in step 450, the UE performs L1-RSRP measurement. In step 460, the UE optionally performs one-shot timing tracking. In step 470, the UE finishes the spatial relation switch procedure and switches to the new spatial relation. Note that when the spatial relation is unknown, the UE should execute the L1-RSRP measurement (RX beam sweeping) to train the downlink spatial domain filter before transmitting the uplink signals with the same spatial domain transmission filter. During the training phase, the UE only has the previous spatial relation information (which UE adopted before receiving the switch command) and also this information is known to network. Therefore, the UE shall be allowed to transmit signals with the previous spatial domain transmission filter, but the signal quality cannot be guaranteed before UE finishes the active spatial relation switching procedure.

Figure 5:
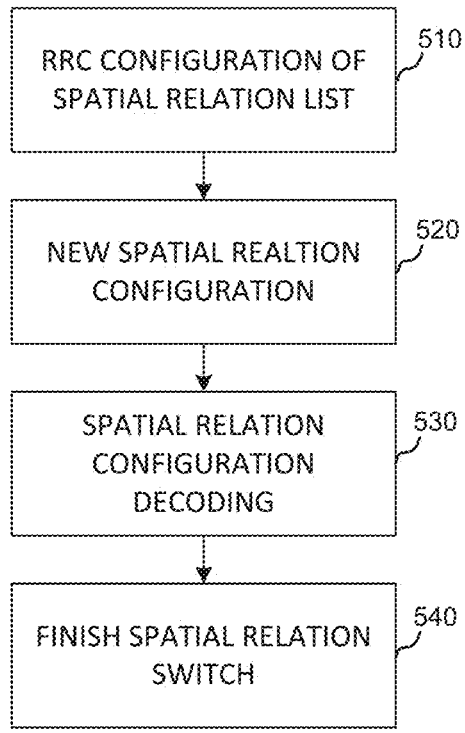
FIG. 5 illustrates one embodiment of a spatial relation switching procedure when the configured spatial relation is QCLed to an SRS.

FIG. 5 illustrates one embodiment of a spatial relation switching procedure when the configured uplink spatial relation is QCLed to an SRS. After some QCLed links, the uplink spatial relation shall be QCLed with SRS with its usage configured as 'beamManagement'. In this case, the UE does not need any additional beam sweeping procedure. Thus, the procedure does not differentiate known and unknown condition when the uplink spatial relation is QCLed to an SRS. In step 510, the network configures a spatial relation list, e.g., a SpatialRelationInfoList to the UE. In step 520, the network directly configures a new spatial relation with SRS index to the UE. In step 530, the UE parses the spatial relation configuration, e.g., QCLed to an uplink SRS index. In step 540, the UE follows the same beam as this uplink SRS.

Figure 6:
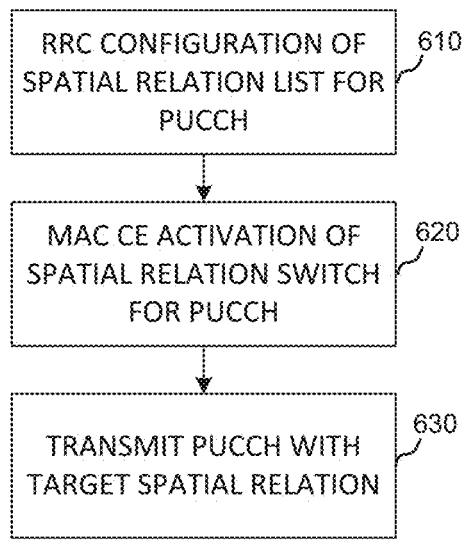
FIG. 6 illustrates one embodiment of PUCCH spatial relation switching in accordance with one novel aspect of the present invention.

FIG. 6 illustrates one embodiment of PUCCH spatial relation switching in accordance with one novel aspect of the present invention. In step 610, a UE receives spatial relation configuration, which comprises up to eight (8) spatial relations, for instance, via an RRC signaling, for an uplink control channel PUCCH. In step 620, one of the spatial relations is activated via MAC CE for the uplink control channel PUCCH, which is a MAC based active spatial relation configuration. In step 630, the UE transmits the PUCCH using a RX spatial domain filter as a reception beam of a DL RS (SSB or CSI-RS) if UE supports the beamCorrespondence capability with 1 or a transmission beam of an UL SRS. As illustrated earlier in FIG. 4, when the active spatial relation is configured to switch to a DL RS, the UE requirements will be different for known spatial relation and unknown spatial relation. On the other hand, when active spatial relation is configured to switch to an UL SRS, the only consideration is the MAC CE parsing time.

Figure 7:
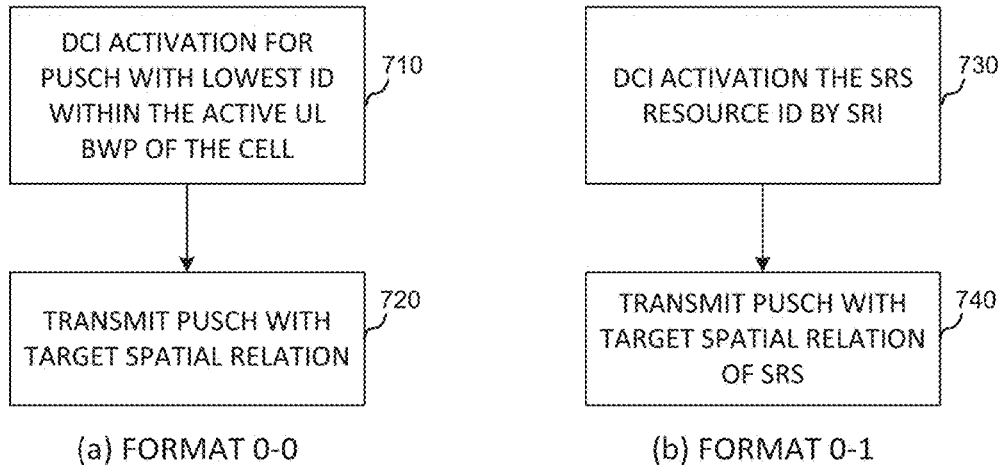
FIG. 7 illustrates embodiments of PUSCH spatial relation switching in accordance with one novel aspect of the present invention.

FIG. 7 illustrates embodiments of PUSCH spatial relation switching in accordance with one novel aspect of the present invention. PUSCH spatial relation is explicitly demonstrated and follows either the PUCCH or SRS spatial relation depending on the DCI command received, i.e., DCI format 0_0 or 0_1. As depicted in FIG. 7(*a*), when DCI format 0_0 is received, PUSCH always follows the same spatial domain transmission filter as for PUCCH. In step 710, the UE receives DCI format 0_0 activation for PUSCH with the lowest ID within the active UL BWP of the cell, which is a DCI based active spatial relation configuration. In step 720, the UE transmits the PUSCH following the same spatial domain filter as a reception beam of a DL RS (SSB or CSI-RS) if UE supports the beamCorrespondence capability with 1 or a transmission beam of an UL SRS, as activated by DCI 0_0.

As depicted in FIG. 7(*b*), when DCI format 0_1 is configured, the UE shall transmit PUSCH using the same antenna ports as the SRS port(s) in the SRS resource(s) indicated by SRI(s). In step 730, the UE receives DCI format 0_1 activation for PUSCH, with the indicated SRS in slot n is associated with the most recent transmission of SRS resource identified by the SRI, which is a DCI based active spatial relation configuration. In step 740, the UE transmits the PUSCH using the same antenna ports as the SRS port(s) in the SRS resource(s) indicated by SRI(s), as activated by DCI 0_1. PUSCH spatial relation activation shall only follow the related PUCCH or SRS spatial relation switch procedure.

Figure 8:
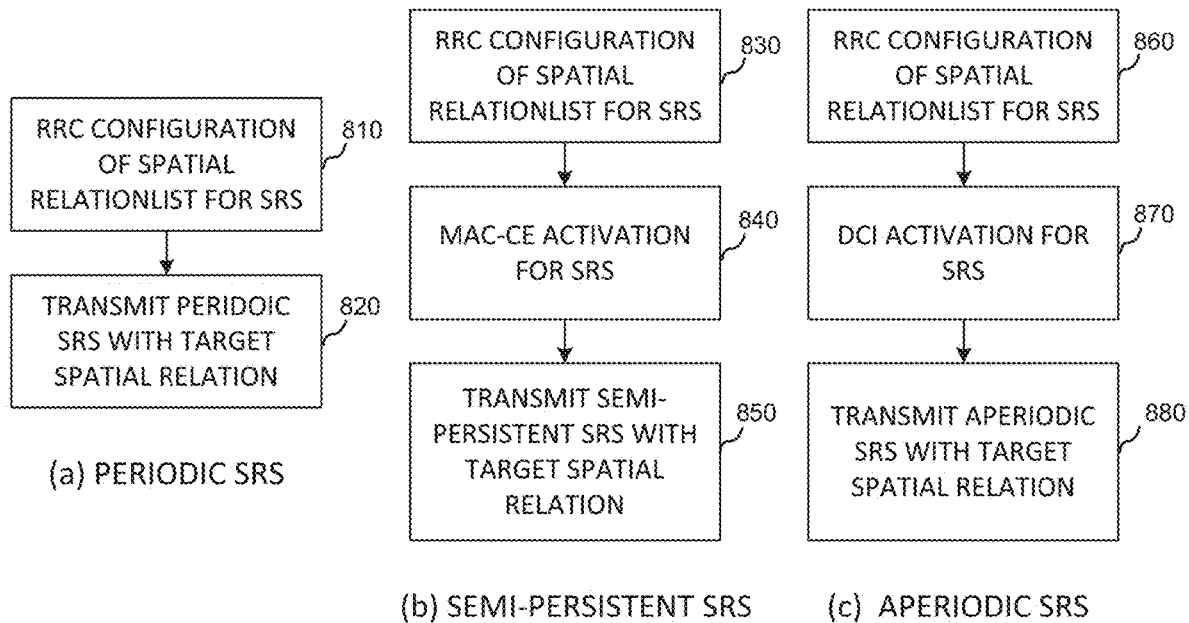
FIG. 8 illustrates embodiments of SRS spatial relation switching in accordance with one novel aspect of the present invention.

FIG. 8 illustrates embodiments of SRS spatial relation switching in accordance with one novel aspect of the present invention. The SRS resources can be periodic, semi-persistent, or aperiodic. In FIG. 8(*a*), a spatial relation list for periodic SRS is configured, for instance, by RRC signaling in step 810. The UE transmits the periodic SRS with the target spatial relation in step 820. If the SRS is associated with another uplink SRS, then the UE will directly use the same beam for this uplink SRS. The UE does not need the additional RX beam sweeping time. If the SRS is associated with a DL RS, then the active spatial relation switch shall differentiate between known and unknown condition.

In FIG. 8(b), a spatial relation list for semi-persistent SRS is configured, for instance, by RRC signaling in step 830. Semi-persistent SRS is activated by MAC-CE in step 840. If the SRS is associated with another uplink SRS, UE will directly use the same beam for this uplink SRS. UE does not need the additional Rx beam sweeping time. When network configures semi-persistent SRS transmission, if the SRS is associated with a DL RS, then the active spatial relation switch shall differentiate between known and unknown condition. The UE transmits the semi-persistent SRS with the target spatial relation in step 850.

In FIG. 8(c), a spatial relation list for aperiodic SRS is configured, for instance, by RRC signaling in step 860. Aperiodic SRS is triggered/activated by DCI command in step 870. For aperiodic SRS, generally, it could be regarded as an urgent sounding behavior. It means the network doesn't want additional beam training time and needs this sounding information as soon as possible. The time interval between the DCI command and the aperiodic SRS transmission is a very short time duration. Thus, the aperiodic SRS should always associate with a known spatial relation. The UE transmits the aperiodic SRS with the target spatial relation in step 880.

Figure 9:
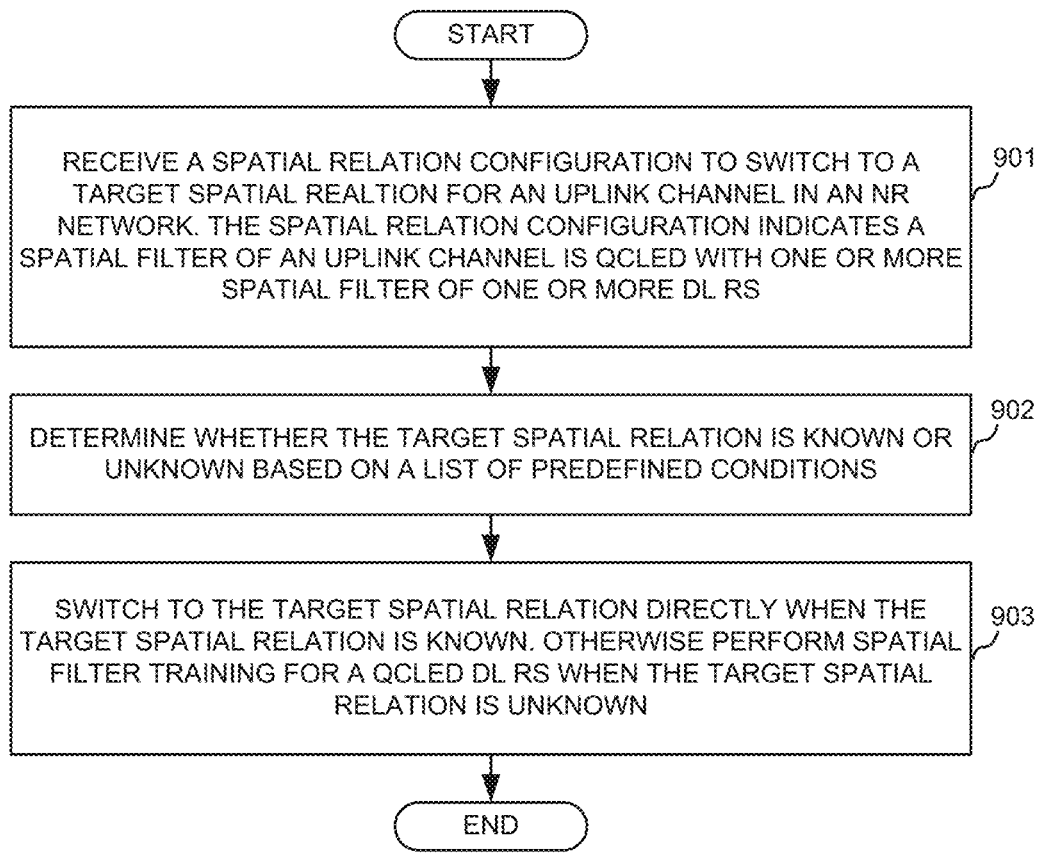
FIG. 9 is a flow chart of a method of performing spatial relation switching in accordance with embodiments of the current invention.

FIG. 9 is a flow chart of a method of performing spatial relation switching in accordance with embodiments of the current invention. In step 901, a UE receives a spatial relation configuration to switch to a target spatial relation for an uplink channel in a new radio (NR) network. According to different embodiments, the spatial relation configuration is received via a radio resource control (RRC) or MAC or DCI signaling. The spatial relation configuration indicates a spatial filter of the uplink channel is Quasi-Co-Located (QCLed) with one or more spatial filters of one or more downlink reference signals (DL RSs). In step 902, the UE determines whether the target spatial relation is known or unknown based on a list of predefined conditions. In step 903, the UE switches to the target spatial relation when the target spatial relation is known, otherwise the UE performs spatial filter training for a QCLed DL RS when the target spatial relation is unknown.

A UE can be configured to implement various embodiments of the above disclosure. The UE can include a processor, a memory, and an RF module as illustrated in FIG. 2. The UE can optionally include other components, such as input and output devices, additional CPU or signal processing circuitry, and the like. Accordingly, the UE may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:
    receiving a spatial relation configuration to switch to a target spatial relation for an uplink channel by a user equipment (UE) in a new radio (NR) network, wherein the spatial relation configuration indicates a spatial filter of the uplink channel is Quasi-Co-Located (QCLed) with one or more spatial filters of one or more downlink reference signals (DL RSs);
    determining whether the target spatial relation is known or unknown based on a list of predefined conditions, wherein the target spatial relation is known when the spatial relation configuration was received within a predefined period of a previous transmission for beam measurement or reporting for the QCLed DL RS of the target spatial relation, the UE has sent at least one measurement report for the QCLed DL RS of the target spatial relation, the target spatial relation remain detectable during a spatial relation switching period, and a signal quality of the QCLed DL RS of the target spatial relation is better than a predefined threshold; and
    switching to the target spatial relation directly when the target spatial relation is known, otherwise performing spatial filter training for a QCLed DL RS when the target spatial relation is unknown.

2. The method of claim 1, wherein the UE performs layer-1 measurements and reporting based on configured measurement objects (MO) such that the target spatial relation is known before receiving the spatial relation configuration.

3. The method of claim 1, wherein the UE transmits uplink signals using a previous selected spatial filter while performing the spatial training.

4. The method of claim 1, wherein the spatial relation configuration is provided via a media-access-control (MAC) based activation or via a downlink control information (DCI) or via an RRC signalling.

5. The method of claim 1, wherein the uplink channel is for a physical uplink control channel (PUCCH) transmission.

6. The method of claim 1, wherein the uplink channel is for a physical uplink shared channel (PUSCH) transmission.

7. The method of claim 1, wherein the uplink channel is for an uplink sounding reference signal (SRS) transmission.

8. A User Equipment (UE) comprising:
a receiver that receives a spatial relation configuration to switch to a target spatial relation for an uplink channel in a new radio (NR) network, wherein the spatial relation configuration indicates a spatial filter of the uplink channel is Quasi-Co-Located (QCLed) with one or more spatial filters of one or more downlink reference signals (DL RSs);
a control circuit that determines whether the target spatial relation is known or unknown based on a list of predefined conditions, wherein the target spatial relation is known when the spatial relation configuration was received within a predefined period of a previous transmission for beam measurement or reporting for the QCLed DL RS of the target spatial relation, the UE has sent at least one measurement report for the QCLed DL RS of the target spatial relation, the target spatial relation remain detectable during a spatial relation switching period, and a signal quality of the QCLed DL RS of the target spatial relation is better than a predefined threshold; and
a beam management handling circuit that switches to the target spatial relation directly when the target spatial relation is known, otherwise performs spatial filter training for a QCLed DL RS when the target spatial relation is unknown.

9. The UE of claim 8, wherein the UE performs layer-1 measurements and reporting based on configured measurement objects (MO) such that the target spatial relation is known before receiving the spatial relation configuration.

10. The UE of claim 8, wherein the UE transmits uplink signals using a previous selected spatial filter while performing the spatial training.

11. The UE of claim 8, wherein the spatial relation configuration is provided via a media-access-control (MAC) based activation or via a downlink control information (DCI) or via an RRC signalling.

12. The UE of claim 8, wherein the uplink channel is for a physical uplink control channel (PUCCH) transmission, or for a physical uplink shared channel (PUSCH) transmission, or for an uplink sounding reference signal (SRS) transmission.

* * * * *